United States Patent [19]
Judkins et al.

[11] Patent Number: 5,764,829
[45] Date of Patent: Jun. 9, 1998

[54] OPTICAL SIGNAL SHAPING DEVICE FOR COMPLEX SPECTRAL SHAPING APPLICATIONS

[75] Inventors: Justin Boyd Judkins, Berkeley Heights; Janet Renee Pedrazzani, Summit; Ashish Madhukar Vengsarkar, Berkeley Heights, all of N.J.

[73] Assignee: Lucent Technologies Inc., Murray Hill, N.J.

[21] Appl. No.: 606,815

[22] Filed: Feb. 26, 1996

[51] Int. Cl.[6] ............................................. G02B 6/34
[52] U.S. Cl. .................. 385/37; 385/27; 385/14; 385/142; 372/102; 359/179
[58] Field of Search ..................... 385/37, 43, 27, 385/130, 131, 129, 14, 141, 142; 372/6, 22, 102, 45, 43, 49; 359/328, 179

[56] References Cited

U.S. PATENT DOCUMENTS

| | | | |
|---|---|---|---|
| 4,928,316 | 5/1990 | Heritage et al. | 455/600 |
| 5,104,209 | 4/1992 | Hill et al. | 385/37 |
| 5,208,877 | 5/1993 | Murphy et al. | 385/12 |
| 5,327,515 | 7/1994 | Anderson et al. | 385/123 |
| 5,363,239 | 11/1994 | Mizrahi et al. | 359/570 |
| 5,367,588 | 11/1994 | Hill et al. | 385/37 |
| 5,400,350 | 3/1995 | Galvanauskas | 372/20 |
| 5,459,801 | 10/1995 | Snitzer | 385/30 |
| 5,473,622 | 12/1995 | Grubb | 372/102 |
| 5,615,008 | 3/1997 | Stachelek | 385/37 X |

FOREIGN PATENT DOCUMENTS 2 289 770  5/1994  United Kingdom ............ G02B 6/00

OTHER PUBLICATIONS

Paper entitled "Long Period Fiber Gratings as Gain Flattening and Laser Stabilizing Devices" by A.M. Vengsarkar, P.J. Lemaire, G. Jacobovits-Veselka, V. Bhatia and J.B. Judkins, in Proc. Tenth International Conference on Integrated Optics and Optical Communications, Jun. 26–30, 1995, Hong Kong.

*Primary Examiner*—Phan T. H. Palmer

[57] ABSTRACT

The present invention provides an optical signal shaping device, such as a long period grating, for use with an optical fiber having a core of a first prescribed refractive index $n_1$ and a cladding of a second prescribed refractive index $n_2$ and configured to transmit an optical signal therethrough. The optical signal shaping device comprises a long period grating of predetermined length formed within the optical fiber. The long period grating has a nonuniform refractive index profile extending over at least a portion of the predetermined length and is configured to alter the optical signal to produce an asymmetrical optical signal.

24 Claims, 8 Drawing Sheets

OPTICAL SIGNAL SHAPING DEVICE FOR COMPLEX SPECTRAL SHAPING APPLICATIONS

TECHNICAL FIELD OF THE INVENTION

The present invention is directed, in general, to optical systems and optical shaping devices and, more specifically, to optical systems and devices employing a chirped long period grating for complex spectral shaping applications.

BACKGROUND OF THE INVENTION

Optical fibers are key components in modern telecommunications. These fibers are thin strands of glass capable for transmitting an optical signal containing a large amount of information over long distances. In essence, an optical fiber is a small diameter waveguide characterized by a core with a first index of refraction surrounded by a cladding having a second, lower index of refraction. Typical optical fibers are made of high purity silica with minor concentrations of dopants to control the index of refraction.

As well known, single fibers can carry multiple packets of data that are multiplexed on the fiber either by time division multiplexing where different slots of time are allocated to different packets or by wave division multiplexing where different wavelengths are allocated for different data channels.

While signals can be transmitted over great distances through optical fibers, bit detection at the receiver becomes unreliable at maximum transmission distances that may vary with the particular fiber optic system. To remedy this problem, optical amplifiers are placed at intervals along the fiber, much as conventional amplifiers are used in analog coaxial-cable systems. The optical amplifier is a single component that delivers at its output a linearly amplified replica of the optical input signal. The optical amplifier is very flexible and can be used for any modulation scheme at any bit-rate.

However, optical amplifiers have two disadvantages associated with their use. First, when used in a WDM system where different wavelengths carry independent streams of information (or channels), the gain provided by the amplifier is not the same for all the channels. This is because the gain spectrum of the amplifier is nonuniform. This nonuniformity is evident even for signals that enter the amplifier with equal amplitudes and is considered the linear nonuniformity, since it does not depend on the intensity of the pulses entering the amplifier. For example, in an erbium doped fiber amplifier, the gain is maximum at around 1558 nm. As a result, the channel centered at 1558 nm will be amplified the most whereas the channel at 1555 nm will not have the same amount of power as it emerges from the amplifier. As these optical channels travel through a succession of amplifiers, the optical pulses (signals) get repeatedly amplified. At this stage, a nonlinear property of the erbium ions in the fiber starts playing an important role. This nonlinear property can be best described as the amplifier's tendency of being partial to signals that enter with higher amplitude; that is, when two signals are incident into the amplifier, the one with the larger amplitude gets amplified more. When optical signals are repeatedly amplified through a succession of amplifiers, the nonuniform gain profile of the amplifier in conjunction with the nonlinear interactions in the erbium amplifier will further exacerbate the problem; that is, the already large signal centered at 1558 nm will get further amplified whereas the relatively lower amplitude signal at 1555 nm will encounter a smaller gain. This will lead to an accelerated deterioration of the signals that are not on the peak of the amplifier gain spectrum. It is therefore desirable to make the gain of each amplifier or chan of amplifiers with respect to wavelength as flat as possible with the use of an optical shaper.

The second disadvantage with the use of the optical amplifiers currently available is that along with the signal being amplified there is generated an amplified spontaneous noise (ASE), which is typically centered at a different wavelength. This noise is detrimental to the integrity of the signal. For example, in an erbium amplifier, the peak of the erbium ASE is at 1532 nm. There is a need for a wavelength dependent loss element that will remove a spectral slice from the wavelengths immediately neighboring the signal wavelengths. More specifically, this wavelength dependent loss element should have zero loss at any of the signal wavelengths. In other words, the transmission spectrum of this device, which removes ASE, should have no side lobes on the longer wavelength side of its main transmission dip, since the signal wavelengths can start as low as 1545 nm. Similarly, in other types of lasers and amplifiers, such as Raman lasers and amplifiers, there is often a need for a similar device with no side lobes on the shorter wavelength side.

Long period gratings that couple light from a guided mode to a nonguided mode are known in the art. In general, a nonguided mode is a mode that is not confined to the core of an optical fiber but uses the regions around the core to travel small distances down the fiber. Typically, a nonguided mode can be a cladding mode, a radiation mode or in the case of a multilayered fiber a ring mode. These long periods act as wavelength dependent loss elements and devices with transmission spectra that match the inverted gain of amplifiers have been previously demonstrated. If the spectral shapes are complex, two or more long period gratings can be combined to match spectra with symmetric multiple minima. The method involves mathematically breaking up the spectrum into a sum of two (or three) Gaussians, making each individual filter and then splicing the devices together. However, if the spectrum has only one minimum and is asymmetric, the problem of deconvolving the spectrum into a sum of several symmetric Gaussians using multiple conventional long period gratings becomes intractable.

Short period gratings that have been chirped by varying the ultra violet (uv) light intensity or placing strain on the optical fiber as the grating is written are also known. However, these short period gratings are not useful in removing certain complex spectral slices from the optical fiber. In short period gratings, such chirping techniques only cause to change the peak wavelength broaden the grating and change the chromatic dispersion. They are not capable of matching the inverted spectrum of rare-earth doped amplifiers. Moreover, because they are short period gratings, they reflect the light backwards from the direction of propagation within the core and are not capable of effectively removing light from the core to the cladding in the forward direction. Therefore, they are not effective in removing undesirable gain from a given wavelength or removing certain complex spectra from the core without inducing back reflections.

Therefore, there is a need in the art for an optical shaping device that can be selectively designed to match the asymmetric spectral shapes typically produced by rare-earth doped amplifiers to either thereby removing undesirable gain at a given wavelength or remove complex spectra from the core of the optical fiber. The optical shaper of the present invention provides such a device.

SUMMARY OF THE INVENTION

The present invention provides an optical signal shaping device for use with an optical fiber having a core of a first prescribed refractive index $n_1$ and a cladding of a second prescribed refractive index $n_2$ and configured to transmit an optical signal therethrough. In a preferred embodiment, the optical signal shaping device comprises a long period grating of predetermined length formed within the optical fiber. The long period grating has a nonuniform refractive index profile extending over at least a portion of the predetermined length and is configured to alter the optical signal to produce an asymmetrical optical signal. In one preferred embodiment, the nonuniform refractive index may include a plurality of nonuniformly spaced index perturbations over at least a portion of the length of the long period grating.

In yet another preferred embodiment, the long period grating can be configured to divert at least a portion of a long wavelength positioned on a long wavelength side of a minima into the cladding, to thereby produce an asymmetrical optical signal having side lobes on the long wavelength side. More preferably, however, the grating diverts a substantial portion of the long wavelength to the cladding to substantially eliminate it from the spectrum.

In yet another aspect of the present invention, the long period grating is configured to divert at least a portion of a short wavelength on a short wavelength side of a minima into the cladding, to thereby produce an asymmetrical optical signal having side lobes on the short wavelength side of the minima. More preferably, however, the grating diverts a substantial portion of the short wavelength to the cladding to substantially eliminate it from the spectrum.

Another aspect of the present invention includes an optical amplifier coupled to the optical fiber. The optical amplifier is of conventional design, preferably a rare-earth doped amplifier, such as an erbium-doped amplifier, and is capable of transmitting an amplified asymmetrical optical signal to the optical fiber. In these applications, the long period grating is configured to divert at least a portion of the amplified asymmetrical optical signal to the cladding and more preferably a substantial portion of the amplified asymmetrical optical signal to the cladding.

The optical amplifier may produce an amplified asymmetrical optical signal that has a short wavelength on a short wavelength side of a minima of the asymmetrical optical signal. In such instances, the long period grating can be configured to divert at least a portion of the short wavelength to the cladding and more preferably a substantial portion of the short wavelength into the cladding. Alternatively, the optical amplifier may produce an amplified asymmetrical optical signal that has a long wavelength on a long wavelength side of a minima of the amplified asymmetrical optical signal. In such instances, the long period grating is configured to divert at least a portion, and more preferably a substantial portion, of the long wavelength to the cladding.

In those instances where the optical amplifier imparts a gain to the amplified asymmetrical optical signal, the long period grating can be configured to divert a predetermined amount of the gain to the cladding.

In another aspect of the present invention, there is provided a method for fabricating an optical signal shaping device. The method comprises the steps of: 1) focusing a writing beam, preferably a laser, on an optical fiber along a predetermined length of a photosensitive portion of the optical fiber and 2) writing a nonuniform refractive index profile extending over at least a portion of the predetermined length such that the optical signal shaping device is configured to alter an optical signal to produce an asymmetrical optical signal.

In one embodiment, the writing step includes the step of varying an intensity of the writing beam over the predetermined length. In yet another embodiment, the writing step includes the steps of: 1) placing a grating mask over the optical fiber along the predetermined length, and 2) applying the writing beam through the long period grating mask onto the optical fiber wherein the long period grating mask has a plurality of nonuniformly spaced slits formed therein, to thereby form a plurality of nonuniformly spaced index perturbations over at least a portion of the predetermined length of the long period grating.

In another aspect of the present method, the writing step includes the step of varying the residence time of the writing beam over the predetermined length, or alternatively, may include the step of straining the optical fiber over the predetermined length.

In yet another aspect of the present method, the writing step includes writing the long period grating to divert at least a portion of a long wavelength positioned on a long wavelength side of a minima into the cladding, to thereby produce an asymmetrical optical signal having side lobes on the long wavelength side.

In another aspect of the present method, the writing step includes writing the long period grating to divert at least a portion of a short wavelength on a short wavelength side of a minima into the cladding, to thereby produce an asymmetrical optical signal having side lobes on the short wavelength side of the minima.

In another aspect of the method invention, the amplified asymmetrical optical signal has a short wavelength on a short wavelength side of a minima of the asymmetrical optical signal and the long period grating is configured to divert at least a portion of the short wavelength to the cladding. Alternatively, the amplified asymmetrical optical signal may have a long wavelength on a long wavelength side of a minima of the amplified asymmetrical optical signal and the long period grating is configured to divert at least a portion of the long wavelength to the cladding.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
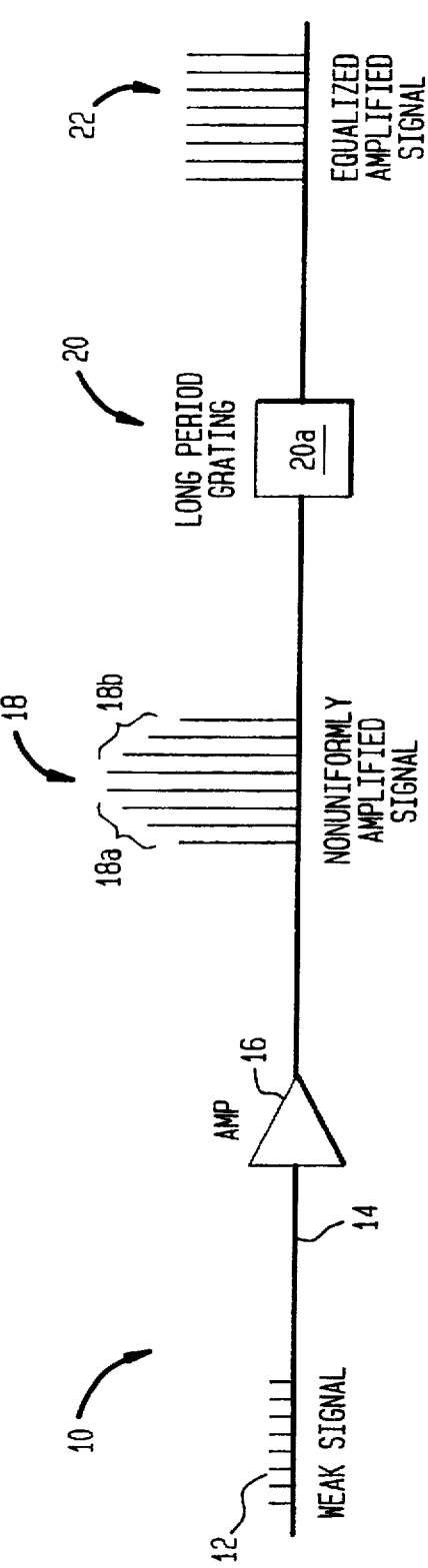
FIG. 1 illustrates a schematic diagram of an optical system in which the present invention is used.

Referring initially to FIG. 1, there is illustrated a schematic diagram of an optical system 10 in which the present invention is used. As shown, an optical signal 12 is transmitted over a conventional optical fiber 14. At maximum transmission distances, the optical signal 12 becomes weak, which makes it necessary for it to be amplified to insure high quality transmission of data. The weak optical signal 12 enters a conventional optical amplifier 16 and is nonuniformly amplified as shown by the schematic spectra 18 in which each of the vertical lines in the schematic spectra 18a represent a different wavelength.

As previously discussed, the optical amplifier 16 is a single component that delivers at its output a linearly amplified replica of the optical input signal 12. Unfortunately, however, as the optical signal 12 is amplified by the optical amplifier 16, the different channels experience different gains and are output with different amplitudes 18a. If gain is imparted to the optical signal 18, it continues to be further amplified as it passes through successive optical amplifiers that are placed along the length of the optical fiber 14. At a certain point, the gain associated with the center wavelength is acquired at the expense of adjacent wavelengths. Thus making them essentially useless for data transmission purposes. Likewise, spectrally dependent noise sources on either side of the amplified wavelength can also that effectively add loss to the optical signal 18. Thus, it is highly desirable to place an optical shaping device 20, such as a long period grating 20a, of the present invention in the optical fiber 14 to remove any such gain or wavelengths. In a typical long period grating, the back reflected light is less than 1% of the transmitted light as opposed to a short period grating with a substantial portion of the light is reflected. The altered and equalized spectrum 22 illustrates how the optical shaper 20 removes the undesirable gain from the spectrum to a quality transmission level. The optical shaping device 20 may be placed in the optical fiber 14 either before the optical amplifier 16, in the middle of the optical amplifier 16 (i.e., inserted bottom two segments of a rare-earth doped fiber) or after the amplifier 16. However, the preferred position for the optical shaping device 20 is in the middle of the optical amplifier 16. As discussed below in detail, the optical shaping device 20 may be configured to remove either the undesirable gain or noise wavelengths or both to produce the amplified, yet equalized optical signal 22.

Figure 1A:
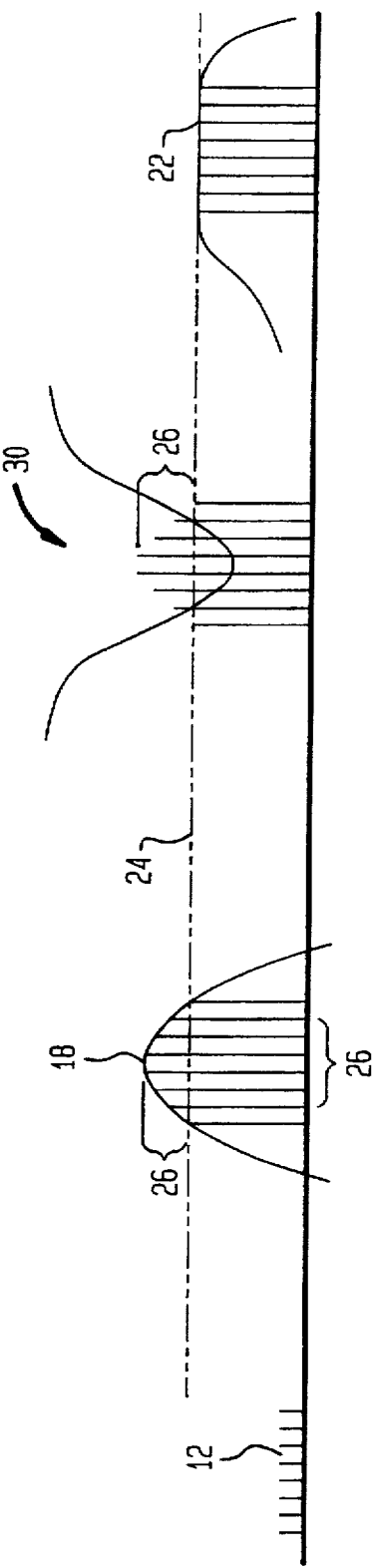
FIG. 1A illustrates a schematic diagram of an incoming weak optical signal as it passes through the optical amplifier, as it passes through the optical signal shaping device and as it leaves the optical signal shaping device.

In FIG. 1A there is schematically illustrated an eight channel wavelength division multiplexed system. The incoming weak optical signal 12 enters the optical amplifier which produces the amplifier's spectrum 18. The dashed line 24 represents the preferred amount of gain necessary for quality data transmission. As shown in the illustration the optical amplifier imparts additional gain 26, which is represented by that portion of the vertical lines extending above the dashed line 24, to certain wavelengths 28. The optical shaper produces a spectrum 30 that is essentially the inverted match of the amplifier's spectrum 18 and that removes the imparted gain 26, which is represented by that portion of the vertical lines that extends above the solid line and to produce the equalized, amplified signal 22.

Figure 2:
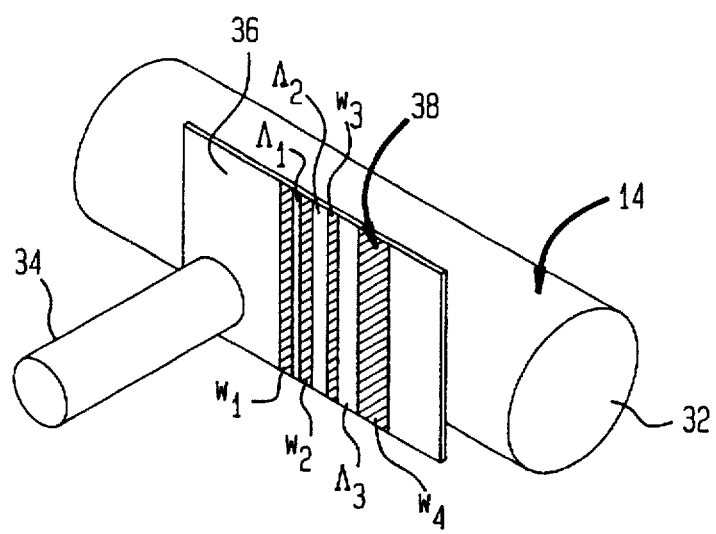
FIG. 2 illustrates a schematic diagram of an apparatus useful in making the optical signal shaping device of the present invention.

Turning now to FIG. 2., there is illustrated a schematic diagram of an apparatus useful in making the optical signal shaping device of the present invention. The optical fiber 14 is preferably a single mode optical fiber that has a silica core 32 doped with a photosensitive material, such as germanium, phosphorous, tin or with electroptic or magnetooptic materials. Further, the optical fiber 14 may be loaded with molecular hydrogen or deuterium to enhance its photosensitivity. The optical shaping device can then be written by selectively exposing the core 32 to a beam of intense light. The optical shaping device is preferably comprised of a long period grating having a nonuniform refractive index profile extending over at least a portion of its length that is configured to alter the optical signal to produce an asymmetrical optical signal. The length of the optical shaping device may vary with the application, but typically, its length ranges from about one centimeter to about five centimeters. Some of the methods for selectively exposing the core 32 to the writing beam include, but are not necessarily limited to: 1) varying the residence time of the beam as a function of the predetermined length of the optical shaping device, 2) varying the intensity of the beam as a function of the optical shaping device's length, 3) varying the periodicity as a function of the optical shaping device's length or 4) straining the optical fiber 14 during exposure to the beam. The preferred exposure source is ultraviolet radiation from a Krypton Fluoride (KrF) excimer laser 34, though other known sources of light used in photosensitive exposure processes may also be used. Proper spacing or light intensity, which is dependent on the spectrum of the particular optical amplifier, can be effected by exposing the optical fiber core 32 to a laser beam with varying intensities spread over the length of the optical shaper. The preferred intensity of the laser 34 is 100 mJ/cm² with the laser 34 preferably having a wavelength of emission equal to 248 nm. Alternatively, as shown in FIG. 2, the optical fiber 14 can be exposed to a wide beam from a laser 34 through an amplitude mask 36 providing a plurality of transparent slits 38 at a variable spacing pattern $\Lambda_1, \Lambda_2, \Lambda_3, \ldots$ etc. and a varying spacing width $w_1, w_2, w_3, w_4, \ldots$, etc. Preferably the exposure dosages for each slit 38 is on the order of 1000 pluses of >100 mJ/cm² fluence/pluse, and the number and spacing of perturbations range greatly depending on the specific optical shaping device.

Whichever method is used, however, the result is an optical shaper having a nonuniform refractive index profile extending at least a portion of the optical shaper's length that is configured to alter the input optical signal to produce an asymmetrical output optical signal wherein at least a portion of the optical signal is diverted to either the core or the cladding, depending on the application. As used herein, a nonuniform index profile is one that produces an asymmetrical optical spectrum. An asymmetrical spectrum is one where there are no mirror images of spectral slices on either side of the main transmission dip, i.e., main minima, when an optical signal is transmitted therethrough. These spectral slices are typically represented by side lobes appearing at a given wavelength on the spectrum, which are understood by those of skill in the art, that have greater transmission capability than the main minima. Moreover, they usually appear adjacent to the main minima in the spectrum as illustrated herein and discussed below.

In some instances, however, it may be preferable to write (i.e., configure) the nonuniform index profile to produce a substantially asymmetrical optical spectrum. What is meant by "substantially asymmetrical" is that the side lobes on only one side of the main minima are capable of effectively transmitting data. In such instances, these side lobes may appear on both sides of the main minima, but the side lobes on only one side of the main minima are capable of effectively transmitting data in the forward propagating direction. In many optical systems, the transmission dip for a given side lobe must be about 0.5 dB or less before data can be effectively transmitted at that side lobes wavelength.

The nonuniformity of the refractive index profile may extend over only a portion of the optical shaper or it may extend over the entire length of the optical shaper. These varying refractive indices along the length of the optical shaper are a function of the way in which the refractive index profile is written into the optical shaper; for example, either by varying the width w of the perturbations, the intensity of the writing beam, the amount of strain placed on the optical fiber 14 during the optical shaper core's 32 exposure to the beam, or varying the residence time of the writing beam along the optical shaper's length. As used herein, the phrase "residence time" means the amount of time at a particular point along the length of the optical shaper that the core 32 is exposed to the beam.

Figure 3:
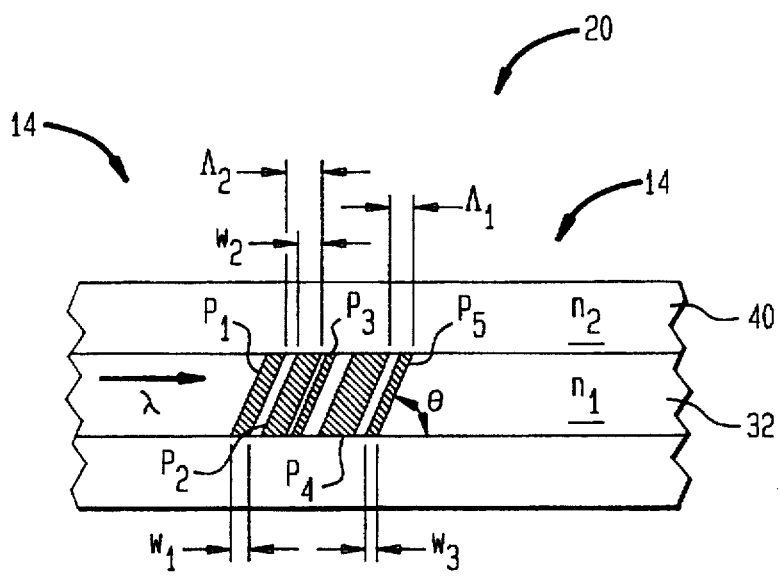
FIG. 3 illustrates a schematic cross section of one preferred embodiment of the optical signal shaping device of the present invention.

Referring now to FIG. 3, there is illustrated a schematic cross section of an embodiment of an optical shaping device 20 of the present invention comprising a length of optical fiber 14 for transmitting an optical signal in a forward propagating mode. The optical fiber 14 has a core 32 with a predetermined refractive index of $n_1$ surrounded by a cladding 40 with a lower predetermined refractive index of $n_2$. In some embodiments, the cladding 40 may comprise multiple layers of different indices, each possessing a different refractive index. Also, the core 32 refractive index $n_1$ may not necessarily be a step function but may vary radially across the core 32. Preferably, the core 32 includes one or more optical shaping devices. In a preferred embodiment, the long period grating comprises a plurality of index perturbations $p_1, p_2, p_3, p_4, p_5, \ldots$ etc. of varying width $w_1, w_2, w_3, \ldots$, etc. spaced apart by a varying periodic distance $\Lambda_1, \Lambda_2, \ldots$, etc. (i.e., periodicity). The perturbations $p_1, p_2, p_3, p_4, p_5, \ldots$, etc. each have a different refractive index that is formed within the core 32. The perturbations $p_1, p_2, p_3, p_4, p_5, \ldots$, etc. are preferably formed at an angle of $\theta(2°<\theta<90°)$ with the longitudinal axis of the optical fiber 14. In such configurations, the optical fiber 14 is designed to transmit a broad band optical signal of wavelength $\lambda$.

As used in the present invention, a long period grating is a grating with a periodicity greater than the wavelength of light (typically greater than 2 microns) that couples a guided mode in an optical fiber to a forward propagating nonguided mode of the optical fiber; that is, the optical signal is not reflected as in a short period grating. A nonguided mode could be either a cladding mode, a radiation mode or a ring mode in the case of a multi-layer wave guide. The core of the wave guide is defined as the central raised index region of the wave guide. The long period grating 20a works on the principle that for a given periodicity $\Lambda$, the guided core mode couples out to the unguided cladding mode when the following phase matching condition is met: $n_{core} - n_{clad} = \lambda/\Lambda$, where $n_{core}$ is the effective index of the core mode, $n_{clad}$ is the effective index of the cladding mode and $\lambda$ is the wavelength of the optical signal at which the equation is satisfied. By effective index of the modes, it is meant that the propagation constant of the individual modes, $\beta$, is divided by the free space propagation constant k, where $k=2n/\lambda$ such that, $n_{core} = \beta_{core}/k$, and $n_{clad} = \beta_{clad}/k$. The above phase matching condition shows that one can modify any of the three free parameters at hand, namely, the effective index of the core 32, the effective index of the cladding 40 or the grating 20a periodicity and change the wavelength at which the device operates. In general, the effective indices of the core $n_{core}$ and cladding $n_{clad}$ modes are directly dependent on the refractive indices (a material property) of both the core $n_1$ and the cladding $n_2$.

Given this general understanding, coupled mode equations have been formulated that allow predictions of how much of the core mode will go into the cladding mode at any given wavelength, and therefore allow the optical spectrum to be accurately predicted. The coupled mode equations account for the core mode. They account for the cladding mode, and they couple the two modes together using the refractive index perturbations formed in the optical shaper 20 of the present invention. Thus, these equations provide a way to predict how the core and cladding modes will be affected by the optical shaper 20.

Two modes in a waveguide exist with amplitudes $U_o(z)$ and $V_o(z)$. These modes are co-propagating and they touch each other in the region where there exists a $\Delta\epsilon$ perturbation to the waveguide. The modes U and V evolve according to the coupled mode equations:

$$dU_o/dZ = j[k_{11}U_o + k_{12}V_o e^{j\delta z}] \quad (1)$$

$$dU_o/dZ = j[k_{21}U_o e^{j\delta z} = k_{22}V] \quad (2)$$

where $\delta = \beta_u - \beta_v$.

The equations may be reduced by making the substitution:

$$U_o = U_1 e^{jK_{11}z}$$

$$V_0 = V_1 e^{jk_{22}z}$$

$$dU_0/dz = [dU_1/dz + jk_{11}U_1]e^{jk_{11}z}$$

$$dV_0/dz = [dV_1/dz + jk_{22}V_1]e^{jk_{22}z}$$

The equations are expressed in $U_1$ and $V_1$ as follows:

$$dU_1/dz = jk_{12}V_1 e^{j(k_{22}-k_{11}+\delta)z} \quad (3)$$

$$dV_1/dz = jk_{22}U_1 e^{-j(k_{22}-k_{11}+\delta)z} \quad (4)$$

A second order differential equation can then be generated for just $U_1$ as follows:

$$d^2U_1/dz^2 - j(k_{22} - k_{11} + \delta) \, dU_1/dz + k_{12}k_{21}U_1 = 0 \quad (5)$$

Using equation (5), $U_1$ and $dU_1/dz$ at position $z_2$ can be solved if $U_1$ and $dU_1/dz$ at position $z_1$, are known, and if $k_{22}$, $k_{11}$ and $\delta$ are constant between $z_1$ and $z_2$. The solution to equation (5) then becomes:

$$U_1(z) = Ae^{\alpha z} + Be^{\beta z}$$

in a region of uniform index. The solution for $U_1$ along the grating is obtained by stepping $z_1, z_2, \ldots Z_{n+1}$ along the fiber and computing new coefficients A,B,$\alpha$, and $\beta$ at each step. The final solution for the transmitted intensity is:

$$|U_0|^2 = UU^*$$

The spectrum from any optical amplifier can be determined by conventional processes. To remove the unwanted portions of the optical amplifier's spectrum, an optical shaper producing an inverted spectrum of the optical amplifier's spectrum can be developed to remove those unwanted portions whether they be in the form of unwanted gain, noise wavelength or both. The above equations can be used to determine what nonuniform refractive index must be written into the optical shaper to remove the unwanted portion of the optical signal produced by the optical amplifier.

Figure 4A:
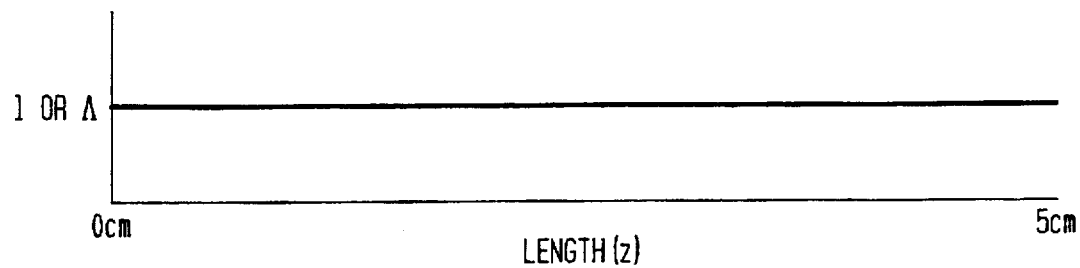
FIG. 4A illustrates a graphical plot of a conventional simple uniform long period grating.

Turning now to FIG. 4A, there is illustrated a graphical plot of a conventional simple uniform long period grating having a length z of 5 cm. As seen by the graph, this grating has a uniform refractive index profile because there is no variation in the intensity I or periodicity A along the grating's length.

Figure 4B:
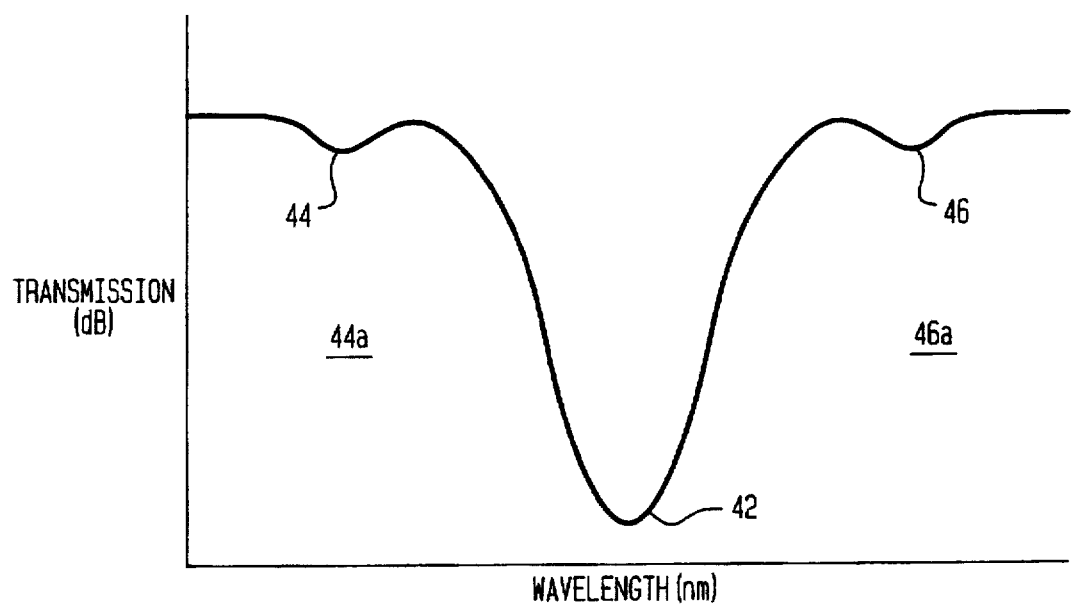
FIG. 4B illustrates the symmetrical spectrum produced by the conventional long period grating.
Figure 5:
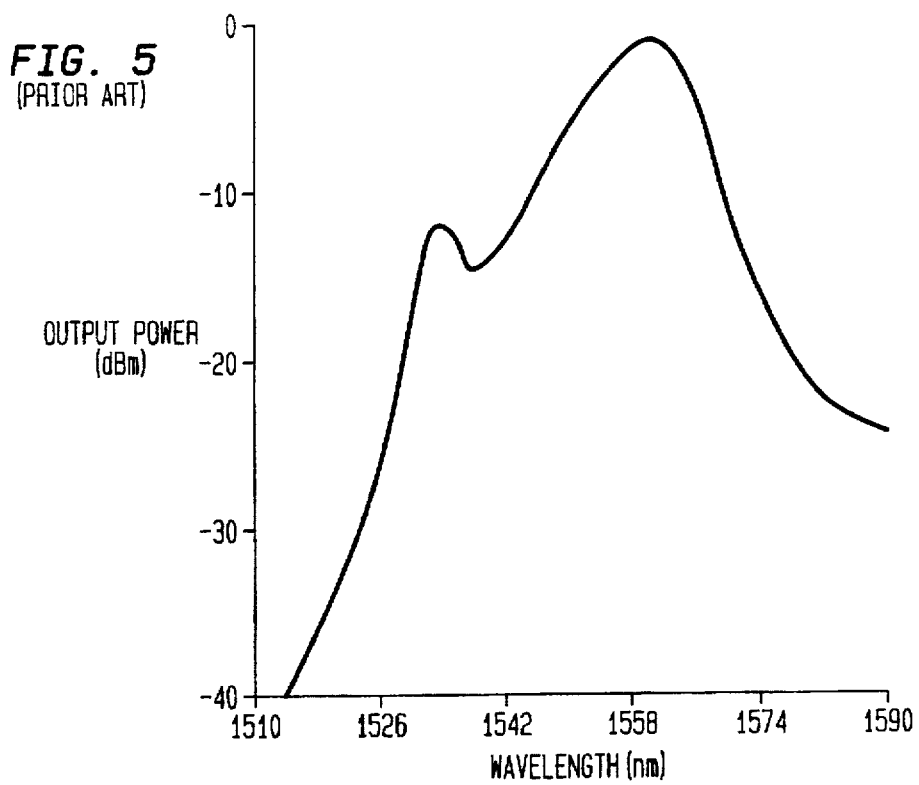
FIG. 5 illustrates the complex, asymmetrical output spectrum of a conventional erbium-doped amplifier.

The spectrum produced by the grating of FIG. 4A is illustrated in FIG. 4B. As shown, the spectrum produced by the uniform grating is symmetrical; that is, there is symmetry about the main minima 42, which represents a substantial dip in transmission. There is also illustrated a short wavelength side lobe 44 appearing on the short wavelength side 44a of the main minima 42 and a long wavelength side lobe 46 appearing on the long wavelength side 46a of the main minima 42. Because of its symmetry, this grating is unable to properly alter a complex, asymmetrical signal produced by an optical amplifier as illustrated in FIG. 5.

Figure 6A:
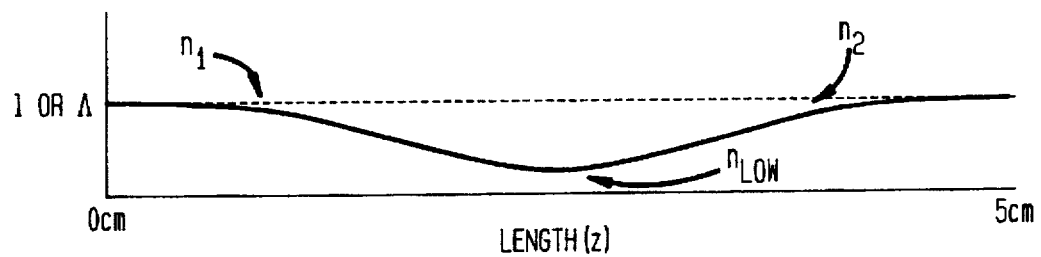
FIG. 6A illustrates a graphical plot of a complex nonuniform long period grating of the present invention showing a varying intensity or periodicity along the length of the grating.

Referring now to FIG. 6A, there is illustrated a graphical plot of a complex, nonuniform long period grating of the present invention showing a slightly inverted Gaussian bean profile that has a varying intensity I or periodicity A along the grating's length of 5 cm. As previously stated, a chain of amplifiers is compensated because the spectrum resulting from sending a light signal of broad bandwidth through the amplifiers gets distorted due to the asymmetric transfer function of the amplifiers. For a chain of erbium amplifiers as are used in current optical communication systems operating at a wavelength around 1550(nm), the asymmetry is present on the shorter wavelength side. In the spectrum illustrated in FIG. 6B, the wavelength of the main peak or main minima 48 is typically at 1558 nm and the optical channels of the system are propagating from 1550 nm on the short wavelength side 50 to 1565 nm on the long wavelength side 52.

Figure 6B:
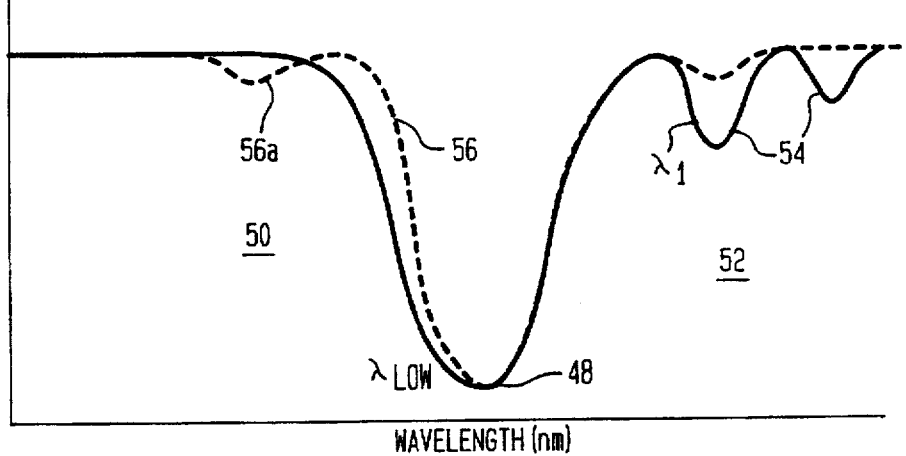
FIG. 6B illustrates a complex asymmetrical spectrum produced by the grating of FIG. 6A shown by the solid line with side lobes formed on the long wavelength side of a minima, while the dashed represents the conventional spectrum first illustrated in FIG. 5B above.

FIG. 6B illustrates the complex, asymmetrical spectrum produced by the grating of FIG. 6A represented by the solid line with side lobes 54 formed on the long wavelength side 52 of a main minima 48. The dashed line 56 represents the conventional symmetrical spectrum first illustrated in FIG. 4B above. While the asymmetry may appear slight, exact shape matching, within 0.1 to 0.2 dB is critical to many optical systems. A key feature of this spectrum is that the side lobes 56a on the shorter wavelength side 50 are effectively removed at the expense of heightened side lobes 54 on the longer wavelength side 52. This phenomenon can be understood by a simple one-to-one correspondence between the refractive index change and the wavelength; if the induced refractive index change is low, shorter wavelengths are affected, and in contrast, as the induced refractive index changes increase, longer wavelengths start to be coupled out to the cladding. By making the grating intensity vary as in FIG. 6A, the coupling for the longer and shorter wavelengths is spatially separated. Overall, the spectrum will be broadened. In addition, it is believed that strong side lobes occur on the long wavelength side due to an interferometric beating between the core mode and the cladding mode. Thus, light at the longer wavelengths is only partially coupled into the cladding mode as it enters the grating. As the two modes propagate along the central region a differential phase delay is introduced that is wavelength dependent. Additional coupling then occurs at the far end of the long period grating. However, because there is a difference in phase between the two modes, the light beats between the two modes. The transmission spectrum, including beats on the long wavelength side is shown in FIG. 6B. The inverted Gaussian feature of the nonuniform refractive index profile thus creates a phenomenon known as modal beating and results in heightened lobes 54 at the long wavelength side 52. On the short wavelength side 50, there are no side lobes This simplified explanation is useful only to obtain a physical understanding of the phenomenon. An accurate quantitative analysis requires the numerical solution of the above described coupled mode equations.

Figure 7A:
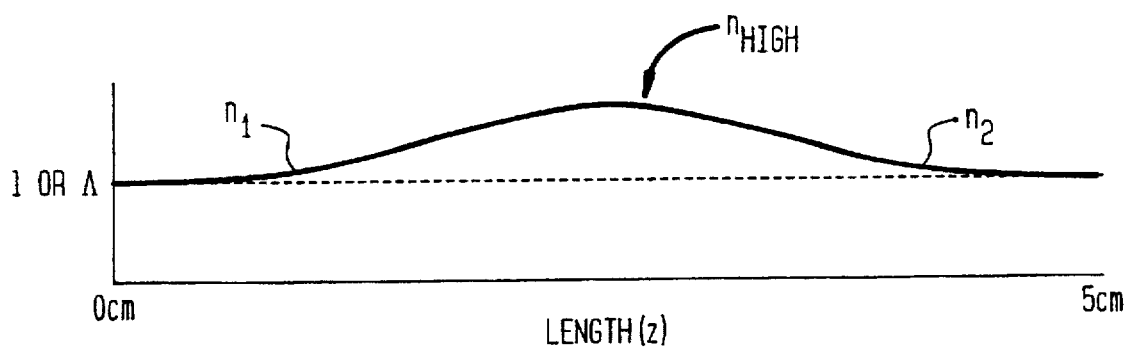
FIG. 7A illustrates a graphical plot of another complex nonuniform long period grating of the present invention showing a varying intensity or periodicity along the length of the grating that produces the spectrum in FIG. 7B below.
Figure 7B:
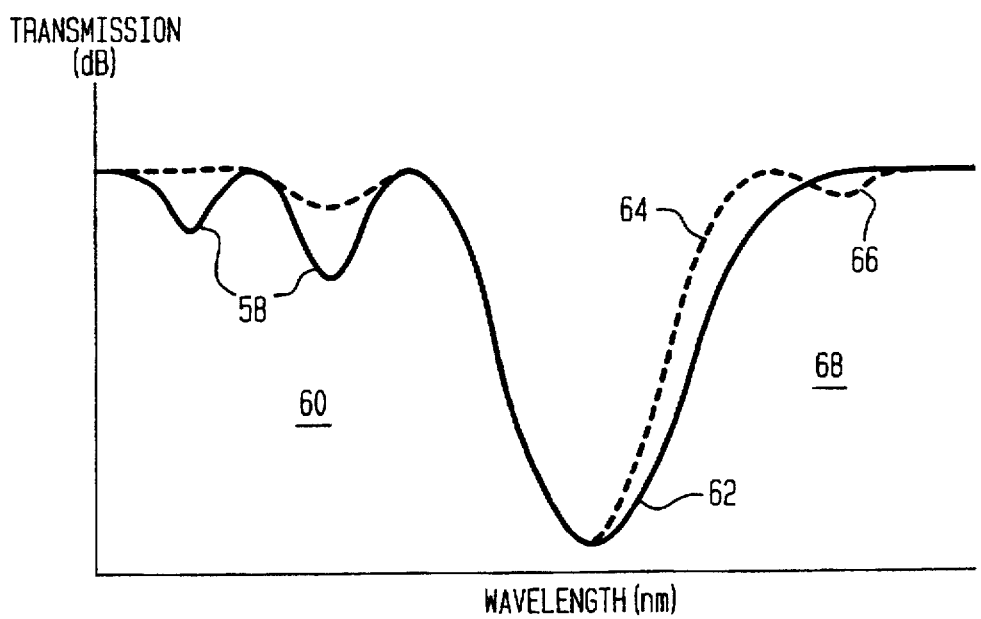
FIG. 7B illustrates a complex asymmetrical spectrum produced by the grating of FIG. 7A shown by the solid line with side lobes formed on the short wavelength side of a main minima, while the dashed represents the conventional spectrum first illustrated in FIG. 5B above.

Turning now to FIG. 7A, there is illustrated a graphical plot of another complex nonuniform long period grating of the present invention showing a varying intensity or periodicity along the length of the grating that produces the spectrum in FIG. 7B. FIG. 7B illustrates a complex asymmetrical spectrum produced by the grating of FIG. 7A shown by the solid line with side lobes 58 formed on the short wavelength side 60 of a main minima 62, while the dashed 64 represents the conventional spectrum first illustrated in FIG. 5B above. When a signal propagates in an erbium amplifier, noise is accumulated along with signal amplification, and this noise along with signal amplification typically predominate at wavelengths centered around 1530 nm. Thus, it is desirable to remove this representative spectral slice centered around 1530 nm without significantly affecting the signal which travels at $\lambda > 1550$ nm. If a uniform beam is used to write a grating centered at 1530 nm, the side lobes that appear on the longer wavelength side, as in FIG. 4B, will effectively add loss to the signal wavelength as well. This loss is detrimental to system performance. As illustrated in FIG. 7B, the side lobes 66 appearing on the long wavelength side 68 have been removed, thereby making that portion of the spectrum available for quality transmission. In some applications, the side lobes may be only substantially removed; that is, the side lobe's transmission dip has been reduced to about 0.5 dB or less.

Figure 8A:
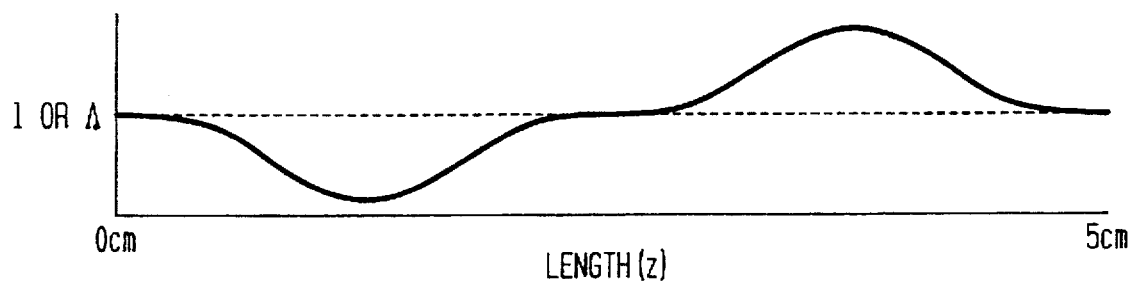
FIG. 8A illustrates a graphical plot of yet another complex nonuniform long period grating of the present invention showing a varying intensity or periodicity along the length of the grating that produces the spectrum in FIG. 8B below.
Figure 8B:
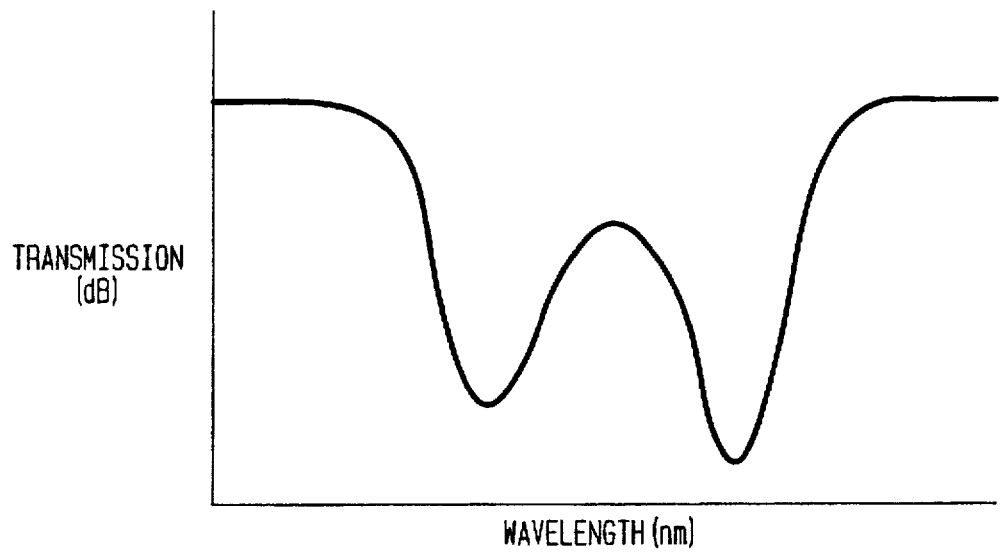
FIG. 8B illustrates a complex asymmetrical spectrum produced by the grating of FIG. 8A.

Referring now to FIG. 8A, there is illustrated a graphical plot of yet another complex nonuniform long period grating of the present invention showing a varying intensity or periodicity along the length of the grating that produces the spectrum in FIG. 8B. FIG. 8B illustrates a complex asymmetrical spectrum produced by the grating of FIG. 8A. These two figures simply illustrate how the optical shaper of the present invention can produce a complex asymmetrical shape without having to concatenate several gratings. FIG. 8A is a schematic graph showing an refractive index/period profile that has multiple peaks which lead to a spectrum with a complicated shape with multiple maxima and minima. Such spectrum is useful for matching the shape of a single erbium amplifier over a broader wavelength range (typically 30–40 nm wide) as shown in FIG. 5.

Figure 9A:
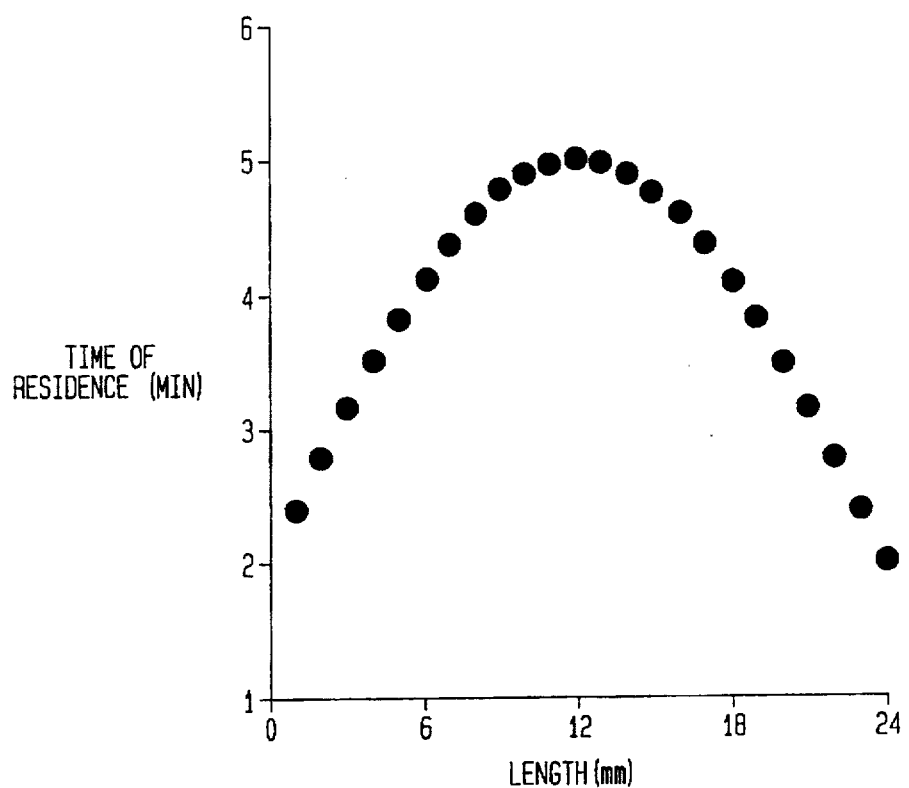
FIG. 9A illustrates a graph of the residence time of a preferred method of manufacturing the long period grating of the present invention.
Figure 9B:
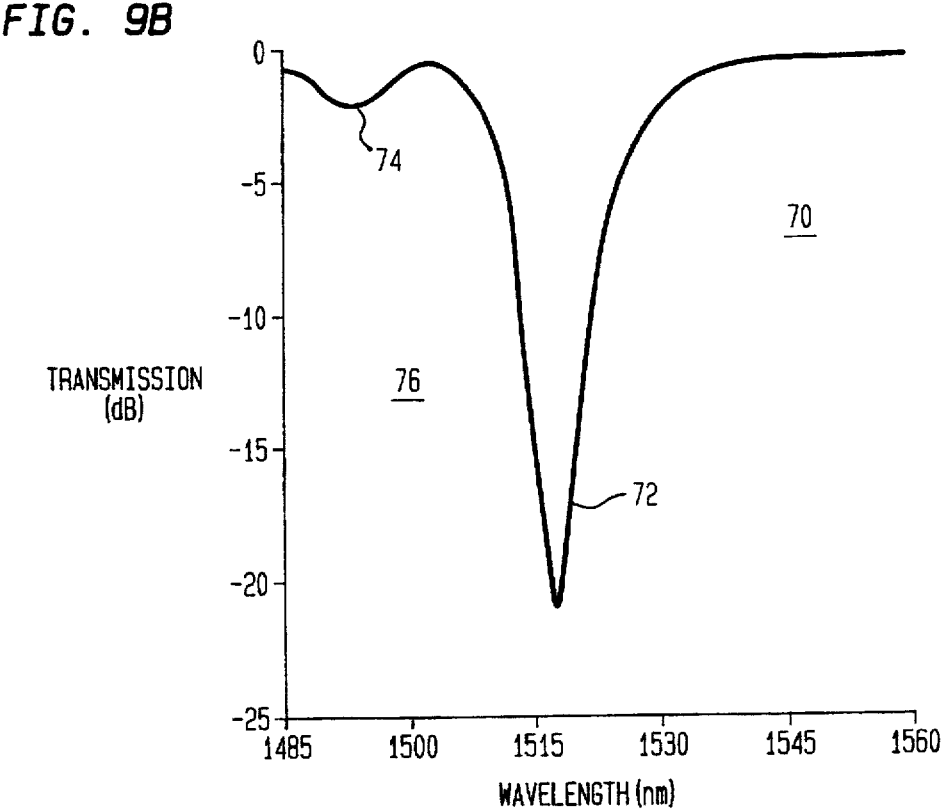
FIG. 9B illustrates the complex, asymmetrical spectrum with a side lobe on the short wavelength side of a main minima produced by the grating of FIG. 9A.

Turning now to FIGS. 9A & 9B, there is respectively illustrated an actual graph of a writing beam residence time curve for a preferred long period grating covered by the present invention and a complex, asymmetrical spectrum with a side lobe on the short wavelength side of a main minima produced by the grating of FIG. 9A. The optical shaping device, was written in a conventional standard dispersion-shifted fiber that had approximately 10 mole percent of germanium in its core. The optical fiber was loaded with molecular hydrogen (2% in core) and was then exposed to a beam from a KrF laser having a wavelength of emission equal to 248 nm. The fluence of the beam was 100 mJ/cm² and the beam was scanned over a length of approximately one inch in accordance with the residence times reflected in FIG. 9A. After the scanning was completed, the grating was annealed in any oven at 150° C. for 24 hours, which removed any residual hydrogen remaining in the core and also helped erase any unstable defects that may have been created in the fiber. After the grating was removed from the oven, the resulting spectrum was measured as illustrated in FIG. 9B. As clearly shown in FIB. 9B, the side lobes on the long wavelength side 70 of the main minima 72 were eliminated at the expense of adding one strong lobe 72 on the short wavelength side 74.

Figure 10A:
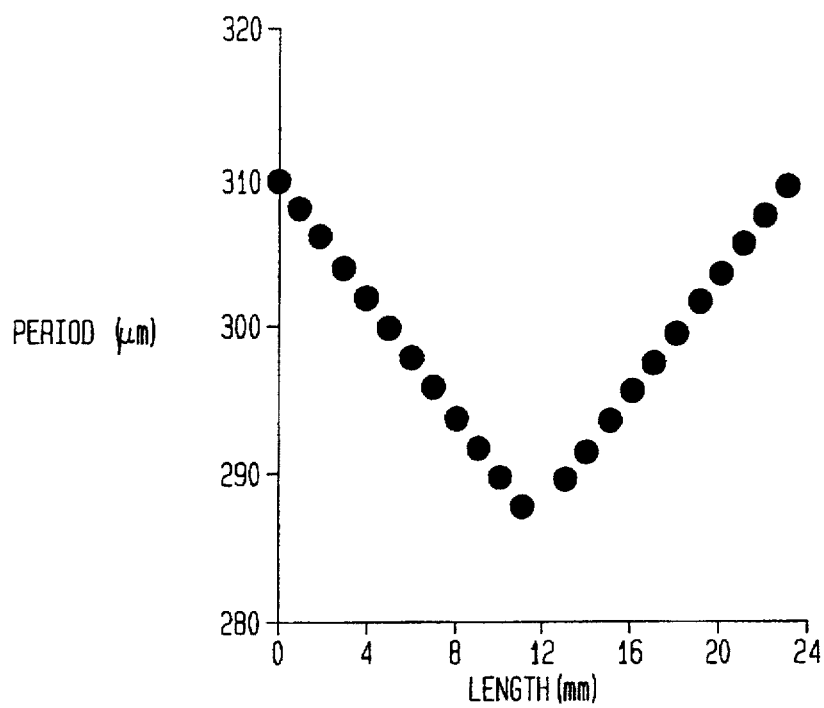
FIG. 10A illustrates a graph of the periodicity of a preferred method of manufacturing the long period grating of the present invention.
Figure 10B:
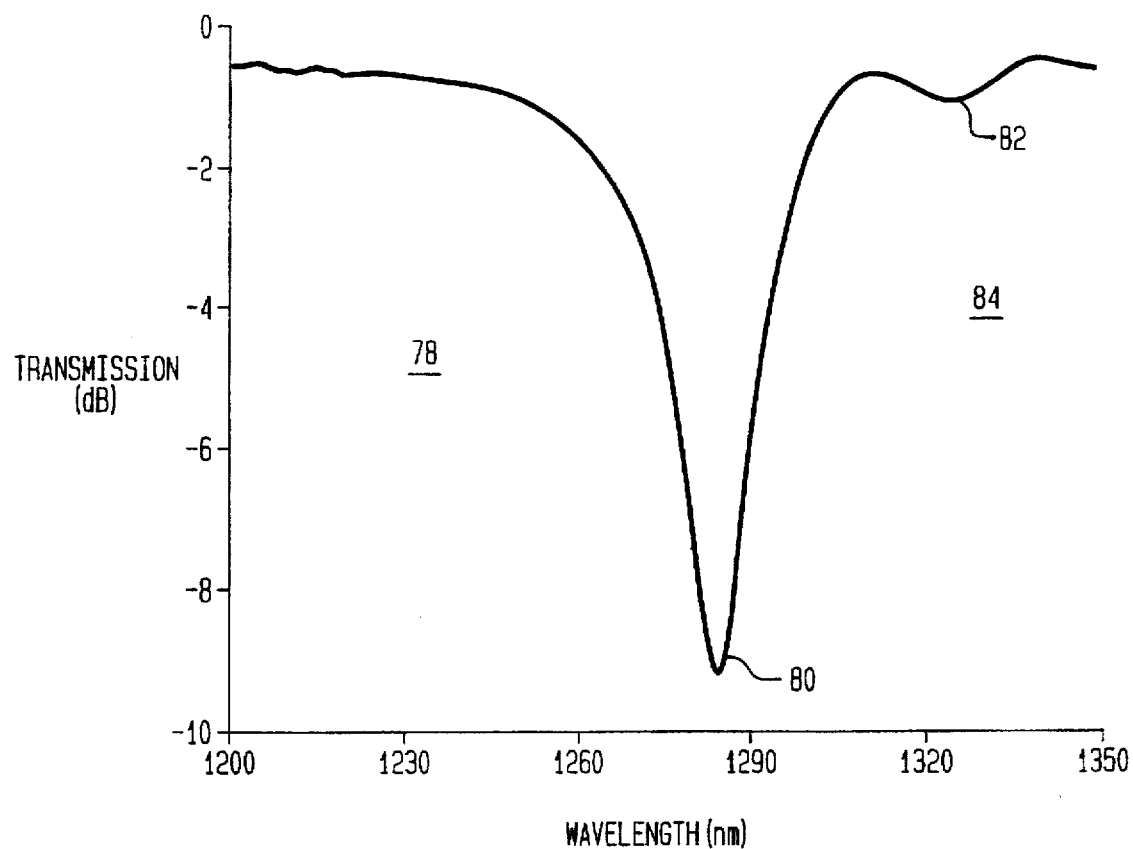
FIG. 10B illustrates the complex, asymmetrical spectrum with a side lobe on the long wavelength side of a main minima produced by the grating of FIG. 10A.

Turning now to FIGS. 10A & 10B, there is respectively illustrated an actual graph showing the periodicity at a function of the length of a preferred long period grating preferred and a complex, asymmetrical spectrum with a side lobe on the long wavelength side of a main minima produced by the grating of FIG. 10A. The optical shaping device, was written in a conventional standard dispersion-shifted fiber that had approximately 10 mole percent of germanium in its core. The optical fiber was loaded with molecular hydrogen (2% in core) and was then exposed to a beam from a KrF laser having a wavelength of emission equal to 248 nm through a mask having a periodicity as reflected in FIG. 10A. The fluence of the beam was 100 mJ/cm² and the beam was scanned over a length of approximately one inch in accordance with the residence times reflected in FIG. 10A. After the scanning was completed, the grating was annealed in any oven at 150° C. for 24 hours, which removed any residual hydrogen remaining in the core and also helped erase any unstable defects that may have been created in the fiber. After the grating was removed from the oven, the resulting spectrum was measured as illustrated in FIG. 10B. As clearly shown in FIB. 10B, the side lobes on the short wavelength side 78 of the main minima 80 were eliminated at the expense of adding one strong lobe 82 on the short wavelength side 84.

Although the present invention and its advantages have been described in detail, those skilled in the art should understand that they can make various changes, substitutions and alterations herein without departing from the spirit and scope of the invention in its broadest form.

What is claimed is:

1. For use with an optical fiber having a core of a first prescribed refractive index $n_1$ and a cladding of a second prescribed refractive index $n_2$ and configured to transmit an optical signal therethrough, an optical signal shaping device, comprising:

a long period grating of predetermined length formed within said optical fiber, said long period grating having a nonuniform refractive index profile extending over at least a portion of said predetermined length and configured to alter said optical signal to produce an asymmetrical optical signal, wherein at least a portion of said optical signal is diverted to said core or said cladding.

2. The optical signal shaping device of claim 1 further comprising an optical amplifier coupled to said optical fiber, said optical amplifier capable of transmitting an amplified asymmetrical optical signal to said optical fiber and wherein said long period grating is configured to divert at least a portion of said amplified asymmetrical optical signal to said cladding.

3. The optical signal shaping device of claim 2 wherein said amplified asymmetrical optical signal has a short wavelength on a short wavelength side of a minima of said asymmetrical optical signal and said long period grating is configured to divert at least a portion of said short wavelength to said cladding.

4. The optical signal shaping device of claim 2 wherein said amplified asymmetrical optical signal has a long wavelength on a long wavelength side of a minima of said amplified asymmetrical optical signal and said long period grating is configured to divert at least a portion of said long wavelength to said cladding.

5. The optical signal shaping device of claim 2 wherein said long period grating is configured to divert a predetermined portion of a gain imparted to said amplified asymmetrical optical signal to said cladding.

6. The optical signal shaping device of claim 2 wherein said optical amplifier is an erbium-doped optical amplifier.

7. The optical signal shaping device of claim 1 wherein said long period grating has a plurality of nonuniformly spaced index perturbations over at least a portion of said length of said long period grating.

8. The optical signal shaping device of claim 1 wherein said long period grating is configured to divert at least a portion of a long wavelength positioned on a long wavelength side of a minima into said cladding, to thereby produce an asymmetrical optical signal having side lobes on said long wavelength side.

9. The optical signal shaping device of claim 1 wherein said long period grating is configured to divert at least a portion of a short wavelength on a short wavelength side of a minima into said cladding, to thereby produce an asymmetrical optical signal having side lobes on said short wavelength side of said minima.

10. A method for fabricating an optical signal shaping device, comprising the steps of:

focusing a writing beam on an optical fiber along a predetermined length of a photosensitive portion of said optical fiber; and writing a nonuniform refractive index profile extending over at least a portion of said predetermined length such that said optical signal shaping device is configured to alter an optical signal to produce an asymmetrical optical signal, wherein at least a portion of said optical signal is diverted to said core or said cladding.

11. The method of claim 10 wherein said writing step includes the step of varying an intensity of said writing beam over said predetermined length.

12. The method of claim 10 wherein said writing step includes the steps of:

placing a grating mask over said optical fiber along said predetermined length; and applying said writing beam through said long period grating mask onto said optical fiber, said long period grating mask having a plurality of nonuniformly spaced slits formed therein, to thereby form a plurality of nonuniformly spaced index perturbations over at least a portion of said predetermined length of said long period grating.

13. The method of claim 10 wherein said writing step includes the step of varying the residence time of the writing beam over said predetermined length.

14. The method of claim 10 wherein said writing step includes straining said optical fiber over said predetermined length.

15. The method of claim 10 wherein said writing step includes writing said long period grating to divert at least a portion of a long wavelength positioned on a long wavelength side of a minima into said cladding, to thereby produce an asymmetrical optical signal having side lobes on said short wavelength side.

16. The method of claim 10 wherein said writing step includes writing said long period grating to divert at least a portion of a short wavelength on a short wavelength side of a minima into said cladding, to thereby produce an asymmetrical optical signal having side lobes on said long wavelength side of said minima.

17. The method of claim 10 wherein said writing beam is a laser.

18. An optical fiber transmission system, comprising:

an optical fiber having a predetermined length and having a core of a first prescribed refractive index $n_1$ and a cladding of a second prescribed refractive index $n_2$ and configured to transmit an optical signal therethrough;

an optical signal shaping device including:

a long period grating of predetermined length formed within a portion of said optical fiber, said long period grating having a nonuniform refractive index profile extending over at least a portion of said predetermined length and configured to alter said optical signal to produce an asymmetrical optical signal; and an optical amplifier coupled to said optical fiber, said optical amplifier capable of transmitting an amplified asymmetrical optical signal to said optical fiber, said long period grating configured to divert at least a portion of said amplified asymmetrical optical signal to said cladding.

19. The optical fiber transmission system device of claim 18 wherein said optical amplifier is an erbium-doped optical amplifier.

20. The optical fiber transmission system of claim 18 wherein said long period grating is configured to divert at least a portion of a short wavelength on a short wavelength side of a minima into said cladding, to thereby produce an asymmetrical optical signal having side lobes on said short wavelength side of said minima.

21. The optical fiber transmission system of claim 18 wherein said amplified asymmetrical optical signal has a short wavelength on a short wavelength side of a minima of said asymmetrical optical signal and said long period grating is configured to divert at least a portion of said short wavelength to said cladding.

22. The optical fiber transmission system of claim 18 wherein said long period grating is configured to divert at least a portion of a long wavelength on a short wavelength side of a minima into said cladding, to thereby produce an asymmetrical optical signal having side lobes on said long wavelength side of said minima.

23. The optical fiber transmission system of claim 18 wherein said amplified asymmetrical optical signal has a long wavelength on a long wavelength side of a minima of said amplified asymmetrical optical signal and said long period grating is configured to divert at least a portion of said long wavelength to said cladding.

24. The optical fiber transmission system of claim 18 wherein said long period grating is coupled to said optical amplifier intermediate opposing ends of said optical amplifier.

* * * * *